United States Patent [19]

Ferris et al.

[11] Patent Number: 4,569,300

[45] Date of Patent: Feb. 11, 1986

[54] LAMINAR FLOW UNDERWATER VEHICLE

[75] Inventors: David S. Ferris, Annapolis; Rosario Gulino, Severna Park; Robert F. Mons, Annapolis, all of Md.

[73] Assignee: Westinghouse Electric Corp., Pittsburgh, Pa.

[21] Appl. No.: 607,099

[22] Filed: May 4, 1984

[51] Int. Cl.$^4$ ............................................. F42B 19/00
[52] U.S. Cl. .................................. 114/20 R; 114/67 R
[58] Field of Search ................. 114/20 R, 67 R, 67 A

[56] References Cited

U.S. PATENT DOCUMENTS

| | | | |
|---|---|---|---|
| 2,969,759 | 1/1961 | Giles | 114/20 R |
| 3,075,489 | 1/1963 | Eichenberger | 114/20 R X |
| 3,076,426 | 2/1963 | Alexander et al. | 114/67 A |
| 3,286,674 | 11/1966 | Thompson et al. | 114/67 R |
| 3,392,693 | 7/1968 | Hulsebos et al. | 114/20 R |
| 3,435,796 | 4/1969 | Merrill | 114/67 A |
| 3,455,265 | 7/1969 | Bernd | 114/67 A |
| 3,455,266 | 7/1969 | Giles | 114/67 A |
| 4,186,679 | 2/1980 | Fabula et al. | 114/67 A X |
| 4,346,662 | 8/1982 | Rogers | 114/20 R |
| 4,395,965 | 8/1983 | Lang | 114/20 R |

Primary Examiner—David H. Brown
Attorney, Agent, or Firm—D. Schron

[57] ABSTRACT

A torpedo having a nose section wherein the entire nose section is of a porous material. The volume behind the nose is divided into a plurality of annular chambers and a fluid delivery system provides filtered sea water to the chambers for expulsion through the porous nose. The filtered water passing over the nose and torpedo body is at a rate to alter the trajectory of any particulate matter that would tend to destabilize laminar boundary layer operation.

13 Claims, 5 Drawing Figures

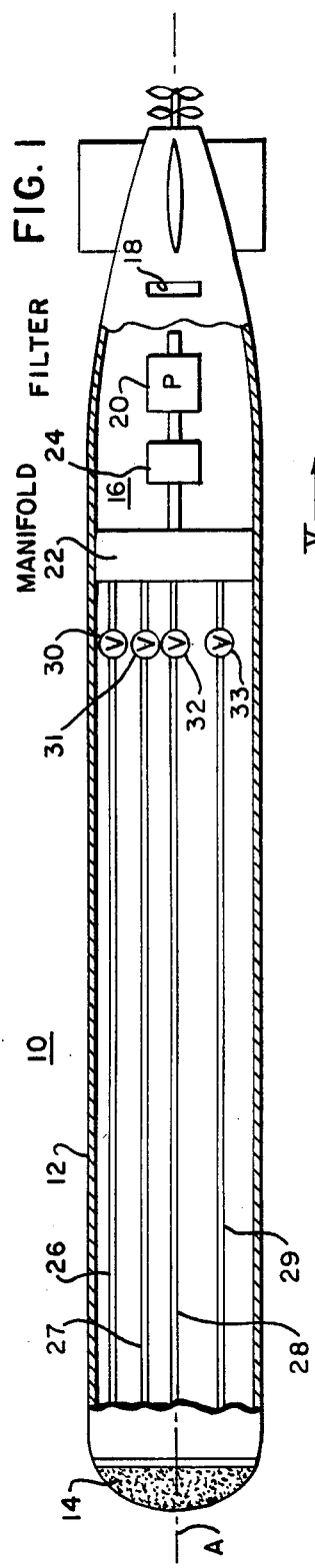
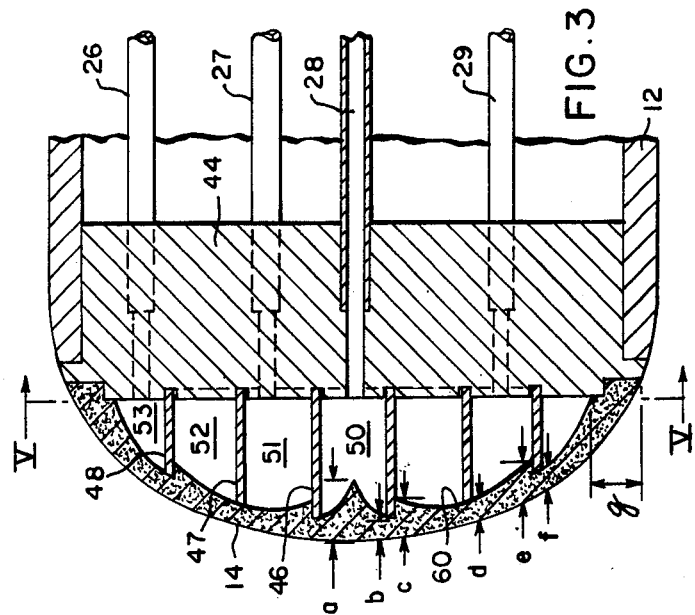
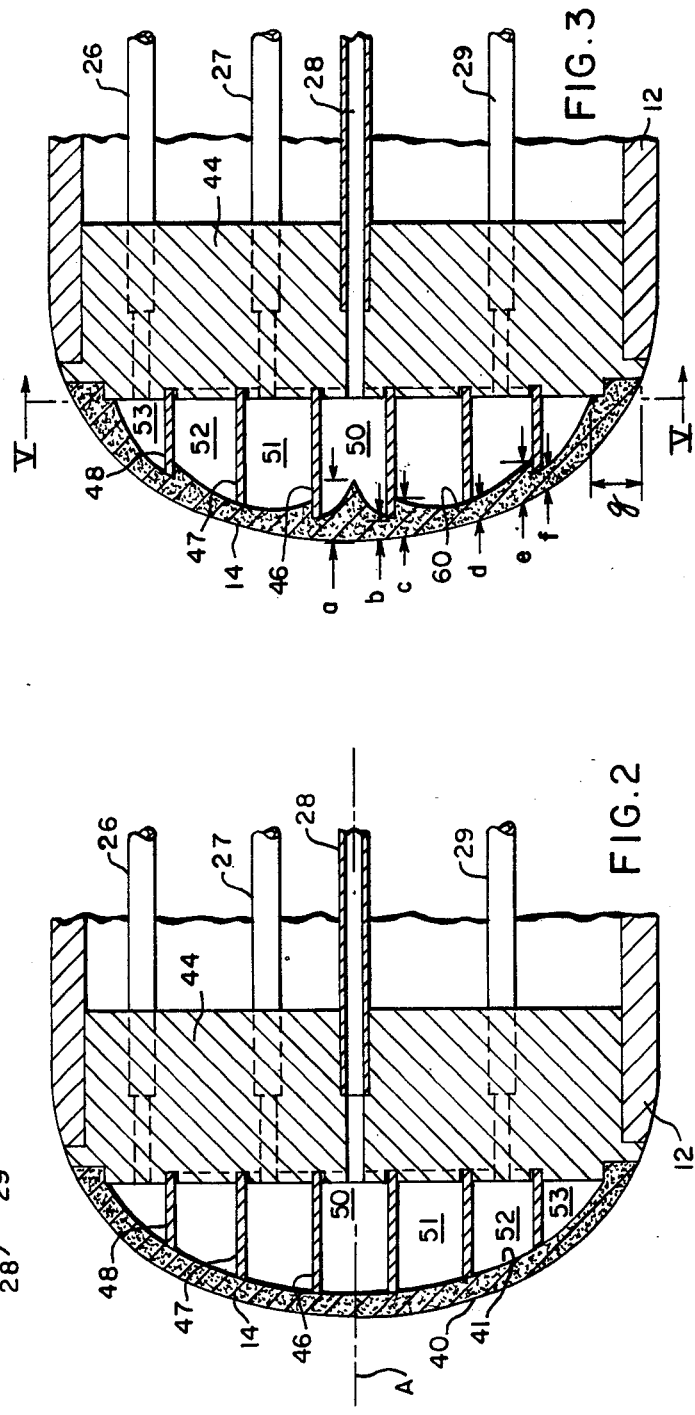

LAMINAR FLOW UNDERWATER VEHICLE

The Government has rights in this invention pursuant to Contract N00140-80-G-9970-0005 awarded by the Department of the Navy.

BACKGROUND OF THE INVENTION

1. Field of the Invention

The invention in general relates to underwater vehicles, and particularly to a laminar flow vehicle having an improved bow or nose portion.

2. Description of the Prior Art

As an underwater vehicle travels through the water, frictional drag forces are present which tend to decrease the vehicle speed. From a hydrodynamic standpoint it is well known that the vehicle speed can significantly be increased by maintaining a laminar boundary layer over its surface by using one of various known boundary layer control techniques such as selective heating of the vehicle shell.

The underwater ambient environment contains particulate matter which if present on the vehicle shell or in the thin fluid boundary adjacent the shell will cause a premature transition from laminar to tubulent flow thus reducing vehicle speed and performance. Particulate matter is herein defined as any bounded material that exhibits fluid properties across the boundary such as air bubbles, solid particles, plankton, etc.

The disruptive effect of particulate induced breakdown can be virtually eliminated if the particles can be removed from the vicinity of the nose portion of the vehicle and breakdown prevented or at least delayed to a few feet further down the vehicle body. This premature breakdown due to particulate matter is overcome by the present invention.

SUMMARY OF THE INVENTION

In the present invention a clean fluid is supplied to the boundary layer in order to reduce or eliminate the particles that can cause the laminar flow breakdowns. The vehicle includes a forward nose section which is of a porous material and means are provided for delivering a filtered fluid such as filtered sea water through the porous nose. The interior volume behind the nose is compartmented into several independent chambers and the filtered fluid is provided to the chambers, at predetermined different pressures, to establish certain flow rates through the porous nose section from the respective chambers. The specific distribution of fluid velocity expelled from the nose section may be given a further degree of fine control by a particular shaping of the concave side of the nose portion.

BRIEF DESCRIPTION OF THE DRAWINGS

FIG. 1 illustrates an underwater vehicle in the form of a torpedo which may incorporate the present invention;

FIG. 2 is an axial cross-sectional view of the nose portion of the torpedo illustrating one embodiment of the present invention;

FIG. 3 is an axial cross-sectional view illustrating an alternate embodiment of the present invention;

DESCRIPTION OF THE PREFERRED EMBODIMENT

Figure 4:
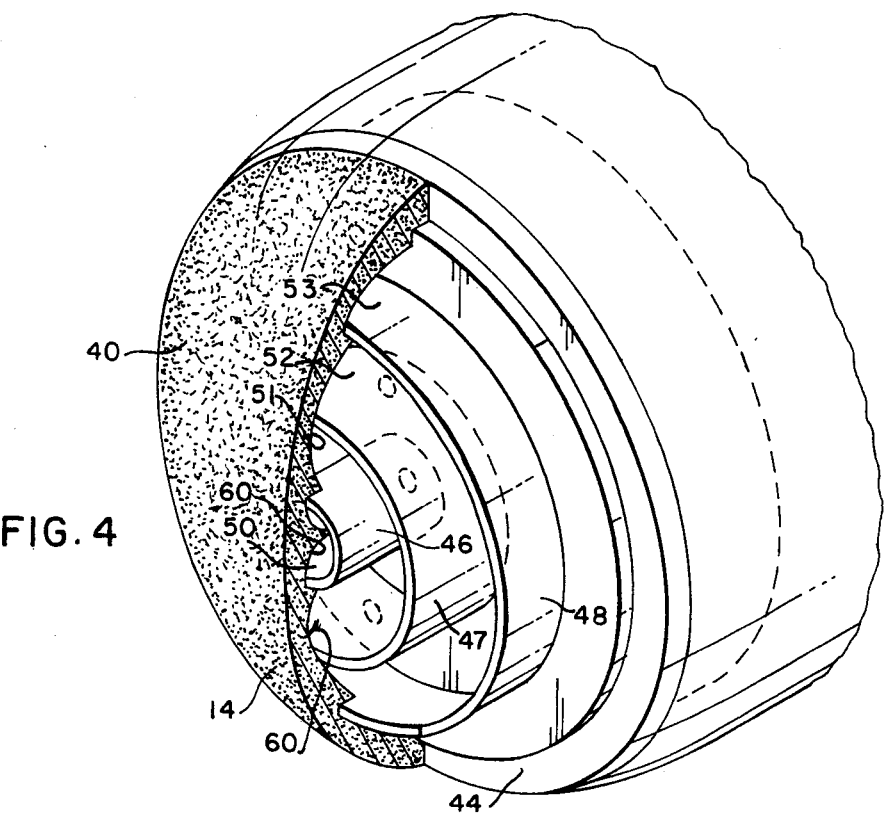
FIG. 4 is a perspective view of the torpedo nose with a portion broken away.

Although the invention is applicable to a variety of underwater vehicles, it will be described by way of example with respect to a torpedo such as illustrated in FIG. 1.

The torpedo 10 includes an elongated body section 12 and a nose section 14 both of which are symmetrically disposed about the torpedo's longitudinal axis A.

Nose 14 is made of a porous material through which a clean fluid is ejected over the entire surface of the nose and swept back along the body portion 12 as the torpedo travels through the water.

The fluid may be the surrounding sea water which enters fluid distribution system 16 through one or more inlets 18 in the torpedo shell. A pump 20 delivers the sea water to a manifold 22 and in order to cleanse the fluid and eliminate any particles that would be large enough to clog the porous nose section, a filter 24 is provided in the fluid line. Although shown in the fluid circuit downstream of the pump, the filter could just as well be placed upstream of it or even form a part of the inlet 18.

The cleansed fluid in manifold 22 is delivered to the porous nose section 14 by means of a plurality of fluid delivery tubes of which four, 26, 27, 28 and 29 are illustrated. The flow rate and pressure of the fluid delivered by tubes 26 to 29 may be selectively controlled so as to vary the velocity distribution of the cleansed fluid as it exits from the nose section. If a single pump is utilized, the selective control of the fluid in lines 26 to 29 may be achieved with the provision of a plurality of valves 30 to 33 each for controlling the fluid in a respective one of the fluid delivery lines. As an alternative, different size restrictions or orifices may be placed in the fluid delivery lines, however, the valves would allow for a greater selection and lend themselves to automatic control.

An axial cross-section of the nose portion is illustrated in FIG. 2. The nose 14 includes an outer convex side 40 and an inner concave side 41 and is made of a porous material so as to allow fluid flow therethrough. By way of example, the porous material which can be effectively formed or machined include sintered ceramic, sintered stainless steel, or a matrix of glass beads in epoxy.

The edge of the porous nose is joined to a backing member 44 such as by epoxy, welding or other bonding material so as to form a closed volume therebetween. A plurality of concentrically arranged cylinders 46, 47 and 48 divide the volume up into a plurality of independent chambers 50, 51, 52 and 53 concentrically arranged about the longitudinal axis A whereby fluid under different pressure and flow rate conditions may be provided to the independent chambers through respective apertures in the backing member 44 in fluid communication with the fluid delivery tubes 26 to 29.

A very high level of clean water ejection, in terms of flow rate, is desired in order to prevent particles from entering the boundary layer and disrupting laminar flow. Accordingly, the entire nose 14 is of a porous material so as to allow for this high level of ejection. The ejection however as a function of arc distance along the nose must be at a controlled rate as required by laminar stability limits. If the flow distribution exceeds certain values it will cause an unwanted transition to turbulent flow. Accordingly, to maintain the maxium level of ejection with the precisely controlled flow rate distribution along the nose, the thickness of the nose is varied from chamber to chamber to get an optimal distribution for the size and running speed of the vehicle. One typical nose design for achieving these objectives is illustrated in FIGS. 3 and 4.

Referring to FIGS. 3 and 4 wherein components previously described have the same reference numerals, it is seen that the inner or concave surface 60 of the nose 14 has an odd, somewhat step shaped, curvature.

The inner surface 60 forming one end of chamber 50 is of a maximum thickness a at the longitudinal axis and decreases in a curvilinear fashion to a thickness b. The surface terminating chambers 51 and 52 is a smooth curve starting out at a thickness c adjacent cylinder 46, where c is greater than b, decreases to a minimum d in chamber 52 and thereafter increases to a thickness e at the inner wall of cylinder 48. The surface terminating the last chamber 53 starts out at a decreased thickness f where f is less than e and increases in a curvalinear fashion to a value g adjacent the base member 44. A nonuniform and irregular thickness of the nose 14 in this manner insures for a controlled distribution which maximizes flow rate out of the nose and along the torpedo body to sweep away any particulate matter so as to reduce or eliminate the chances of particulate induced breakdown of laminar flow, with the flow rate being so controlled that itself is not a contributing factor to such breakdown.

Figure 5:
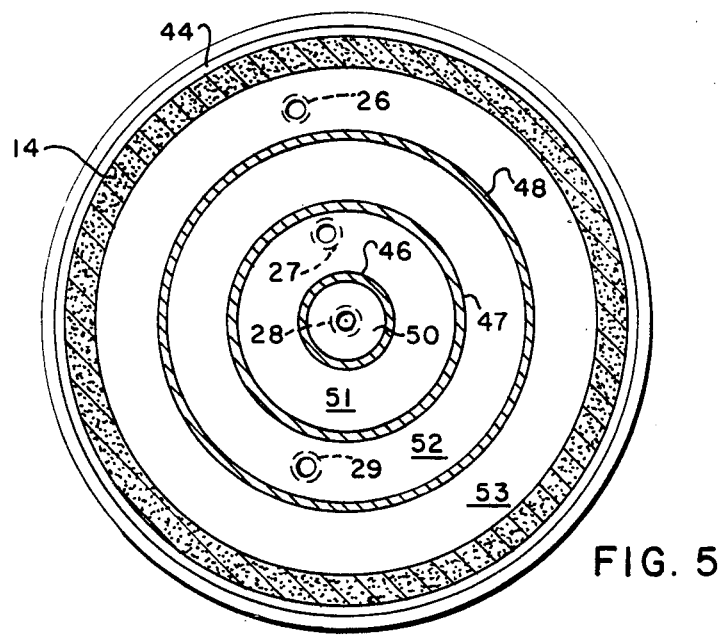
FIG. 5 is a view along lines V—V of FIG. 3.

FIG. 5 is a view along lines V—V of FIG. 3 and illustrates the location of the penetration of the fluid delivery lines 26 to 29 into the respective chambers. It has been mentioned that the flow rate into the chambers may be controlled by means of valves 30 to 33 for example (FIG. 1). Another method of controlling fluid entry into the chambers is by providing each chamber with one or more such fluid delivery lines, the number and/or aperture diameters being selectively variable from chamber to chamber.

We claim:
1. An underwater vehicle comprising:
 (a) a body portion extending along a longitudinal axis;
 (b) a nose portion connected to said body portion;
 (c) said nose portion being of a porous material;
 (d) a backing member disposed behind said nose portion so as to form a closed volume therebetween;
 (e) means defining a plurality of independent chambers around said axis in said closed volume;
 (f) means for delivering a clean fluid to said independent chambers at respective pressures whereby said fluid will be ejected through said porous nose section from said chambers to alter the trajectory of particulate matter from said nose and body sections as said vehicle moves through the ambient water medium.

2. Apparatus according to claim 1 wherein:
 (a) said chambers are formed from a plurality of concentric cylinders extending from said backing member to the inside surface of said nose section.

3. Apparatus according to claim 1 wherein:
 (a) said nose portion has a smooth curvilinear outer convex surface and a smooth curvilinear inner concave surface.

4. Apparatus according to claim 1 wherein:
 (a) said underwater vehicle is a torpedo.

5. Apparatus according to claim 1 wherein:
 (a) said nose portion has a smooth curvilinear outer convex surface and an irregular shaped inner surface.

6. Apparatus according to claim 5 wherein:
 (a) said inner surface is generally stepped with said steps being curvilinear.

7. Apparatus according to claim 5 wherein:
 (a) The maximum thickness of said nose section is located along said axis.

8. Apparatus according to claim 1 wherein:
 (a) said means for delivering said fluid is located within said body section.

9. Apparatus according to claim 8 wherein:
 (a) said fluid is seawater.

10. Apparatus according to claim 9 which includes:
 (a) means for filtering said seawater prior to delivery to said chambers.

11. Apparatus according to claim 8 wherein:
 (a) said means for delivering said fluid includes:
  (i) a pump,
  (ii) a manifold for receiving pumped fluid,
  (iii) a plurality of fluid delivery lines connecting said manifold with said chambers; and
  (iv) means for controlling fluid flow within said fluid delivery lines.

12. Apparatus according to claim 11 wherein:
 (a) said means for controlling comprises a plurality of valves each located in a respective one of said fluid delivery lines.

13. Apparatus according to claim 11 wherein:
 (a) the number of said fluid delivery lines is the same as the number of said chambers.

* * * * *